US012693586B2

(12) United States Patent
Wu

(10) Patent No.: US 12,693,586 B2
(45) Date of Patent: Jul. 28, 2026

(54) CASE STRUCTURE

(71) Applicant: Coretronic Corporation, Hsin-Chu (TW)

(72) Inventor: Chia-Cheng Wu, Hsin-Chu (TW)

(73) Assignee: Coretronnic Corporation, Hsin-Chu (TW)

( * ) Notice: Subject to any disclaimer, the term of this patent is extended or adjusted under 35 U.S.C. 154(b) by 99 days.

(21) Appl. No.: 18/755,720

(22) Filed: Jun. 27, 2024

(65) Prior Publication Data

US 2025/0013135 A1      Jan. 9, 2025

(30) Foreign Application Priority Data

Jul. 4, 2023     (TW) ................................. 112124885

(51) Int. Cl.
G03B 21/14 (2006.01)
(52) U.S. Cl.
CPC ................................. G03B 21/145 (2013.01)
(58) Field of Classification Search
CPC ................................ G03B 21/145; H05K 5/03
See application file for complete search history.

(56) References Cited

U.S. PATENT DOCUMENTS

| | | | | |
|---|---|---|---|---|
| 6,755,541 | B2 * | 6/2004 | Nakano ................ | G03B 21/145 353/87 |
| 8,398,250 | B2 * | 3/2013 | Adachi ................ | G03B 21/208 312/10.1 |
| 9,110,360 | B2 * | 8/2015 | Mikutsu ................. | G03B 21/20 |
| 9,844,158 | B2 | 12/2017 | Shi et al. | |
| 10,324,365 | B2 * | 6/2019 | Kita ......................... | H04N 5/74 |
| 2013/0050659 | A1 * | 2/2013 | Awane ............... | G02B 27/0006 353/61 |
| 2016/0011494 | A1 * | 1/2016 | Otsuki ................... | G03B 21/14 353/119 |
| 2019/0179214 | A1 * | 6/2019 | Hara ........................ | H05K 5/03 |
| 2020/0408414 | A1 * | 12/2020 | Helminger .............. | F24C 7/083 |

FOREIGN PATENT DOCUMENTS

| | | | |
|---|---|---|---|
| CN | 1387083 | | 12/2002 |
| CN | 113228835 | | 8/2021 |
| JP | H0723332 U | * | 4/1995 |
| JP | 2000258842 A | * | 9/2000 |
| JP | 2003043584 A | * | 2/2003 |

(Continued)

*Primary Examiner* — Andrew Roersma
(74) *Attorney, Agent, or Firm* — JCIPRNET

(57) ABSTRACT

A case structure, adapted for a projection device, includes an enclosure, a base and a cover plate. The enclosure has an opening. The base is located at the opening and has a receiving groove. The cover plate slides relative to the base to move to a closed position. The cover plate includes a first engaging portion on a first cover plate side, a first positioning portion on a second cover plate side, multiple elastic members and multiple slide groove structures on a third cover plate side and a fourth cover plate side. The slide groove structures are located between the elastic members and the first positioning portion in the first direction. The base includes a second engaging portion on a first base side, a second positioning portion on a second base side, multiple pillars and multiple sliders on a third base side and a fourth base side.

11 Claims, 12 Drawing Sheets

(56)                    References Cited

FOREIGN PATENT DOCUMENTS

| | | | | |
|----|--------------|----|---|---------|
| JP | 2007335201 A | * | 12/2007 | |
| JP | 2009210860 A | * | 9/2009 | |
| JP | 2010197848 A | * | 9/2010 | |
| JP | 2017181770 A | * | 10/2017 | |
| TW | 522282 | | 3/2003 | |
| TW | 570450 | | 1/2004 | |
| WO | 2006013702 | | 2/2006 | |
| WO | WO-2010143275 A1 | * | 12/2010 | ........... G03B 21/145 |

* cited by examiner

CASE STRUCTURE

CROSS-REFERENCE TO RELATED APPLICATION

This application claims the priority benefit of Taiwan application serial no. 112124885 filed on Jul. 4, 2023. The entirety of the above-mentioned patent application is hereby incorporated by reference herein and made a part of this specification.

BACKGROUND

Technical Field

The disclosure relates to a case structure, and in particular relates to a case structure applicable to a projection device.

Description of Related Art

With the development of science and technology, the design of a product case structure not only needs to meet the functional requirements of the product, but also has higher and higher requirements for the appearance quality of the case structure and the engaging force of each component of the enclosure. For example, the requirements for the step and gap between the cover plate and the enclosure of the case structure, as well as the requirements for the engaging force and loosening force between the cover plate and the enclosure.

However, in a limited space, a complex design may increase the assembly steps of the product line and increase the cost of parts, and the difficulty of tolerance precision matching is relatively high, such that the requirements of appearance quality and engaging force cannot be met.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

A case structure, which has good engaging force between the cover plate and the base, and may maintain the appearance quality requirement of the case structure, is provided in the disclosure.

The other objectives and advantages of the disclosure may be further understood from the descriptive features disclosed in the disclosure.

In order to achieve one of, or portions of, or all of the above objectives or other objectives, the invention provides a case structure adapted for a projection device, including an enclosure, a base, and a cover plate. The enclosure has an opening. The base is located at the opening and has a receiving groove. The cover plate is adapted to slide relative to the base along a first direction, so that the cover plate moves to a closed position. The cover plate has a first cover plate side and a second cover plate side opposite to each other in a first direction and a third cover plate side and a fourth cover plate side opposite to each other in a second direction perpendicular to the first direction. The cover plate includes a first engaging portion located on the first cover plate side, a first positioning portion located on the second cover plate side, multiple elastic members and multiple slide groove structures located on the third cover plate side and the fourth cover plate side. In the first direction, the slide groove structures are located between the elastic members and the first positioning portion. The base has a first base side and a second base side opposite to each other in the first direction, and a third base side and a fourth base side opposite to each other in the second direction. The base includes a second engaging portion located on the first base side, a second positioning portion located on the second base side, multiple pillars and multiple sliders on the third base side and the fourth base side. The sliders are located between the pillars and the second positioning portion. When the cover plate is in the closed position, the first engaging portion is connected to the second engaging portion, the first positioning portion corresponds to the second positioning portion, the elastic members are respectively connected to the pillars, and the slide groove structures are respectively connected to the sliders.

In an embodiment of the invention, the second positioning portion has a groove, and when the cover plate is in the closed position, the end surface of the first positioning portion is located in the groove.

In an embodiment of the invention, each of the elastic members has a first end connected to the cover plate and a second end extending toward the first cover plate side. Each of the elastic members includes a hook located at the second end, each of the pillars has an inclined surface, and when the cover plate moves to the closed position, each of the hooks slides from one side of each of the pillars to another side of each of the pillars along each of the inclined surfaces and is buckled with each of the pillars.

In an embodiment of the invention, the inclined surface has a front end and a terminal end, and the terminal end is higher than the front end and is closer to the second engaging portion than the front end.

In an embodiment of the invention, the cover plate has an outer surface and an inner surface, the elastic members are disposed on the inner surface, and the cover plate includes a protruding rib on the outer surface. The protruding rib is located on the first cover plate side and corresponds to the first engaging portion.

In an embodiment of the invention, the cover plate has a first inner surface and a second inner surface, the first inner surface is located between the elastic members, and the second inner surface is located between the first inner surface and the first engaging portion. A normal direction of the first inner surface is perpendicular to the first direction and perpendicular to the second direction, and the second inner surface is inclined to the first inner surface.

In an embodiment of the invention, the cover plate has an outer surface, and an average thickness between the first inner surface and the outer surface is greater than an average thickness between the second inner surface and the outer surface.

In an embodiment of the invention, a quantity of the elastic members is two, in which the elastic members are respectively located on the third cover plate side and the fourth cover plate side, and a quantity of the pillars is two, in which the pillars are respectively located on the third base side and the fourth base side.

In an embodiment of the invention, the base includes two side walls respectively located at the third base side and the fourth base side, each of the sliders is connected to a corresponding side wall, and when the cover plate moves to the closed position, each of the sliders enters a corresponding slide groove structure along the first direction.

In an embodiment of the invention, the base includes a side wall located at the first base side and an extension wall connected to the top of the side wall, the second engaging portion is located on a side of the extension wall away from the cover plate, the side wall has a hole close to the second engaging portion, and when the cover plate is in the closed position, the first engaging portion passes through the hole to be buckled with the second engaging portion.

Based on the above, in the case structure of the invention, when the cover plate is in the closed position, the first engaging portion is connected to the second engaging portion, the first positioning portion corresponds to the second positioning portion, the elastic members are connected to the pillars, and the slide groove structures are connected to the sliders. In this way, good engaging force may be achieved between the cover plate and the base and the appearance quality requirement of the case structure may be maintained.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
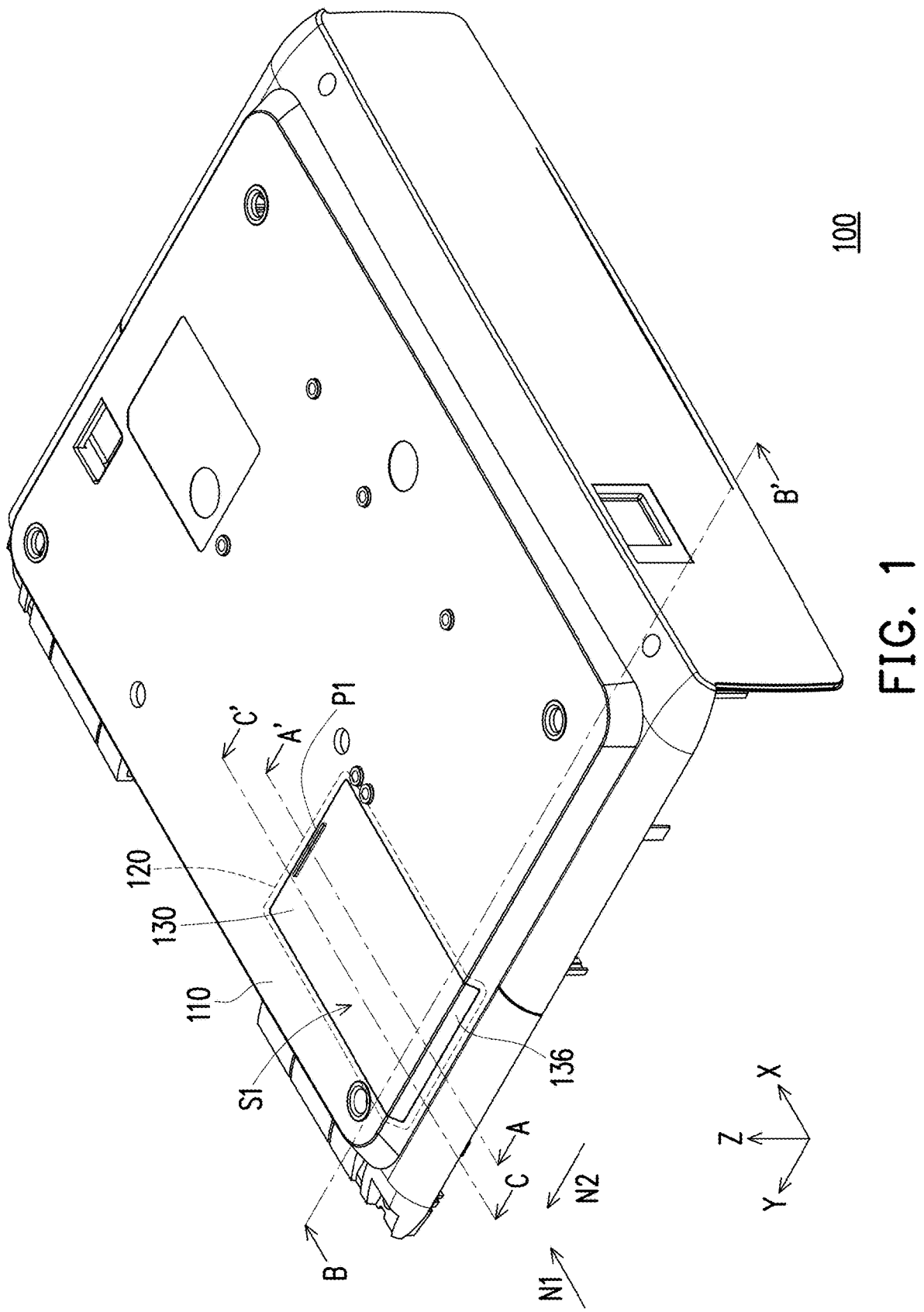
FIG. 1 is a schematic diagram of a case structure according to an embodiment of the invention.
Figure 2:
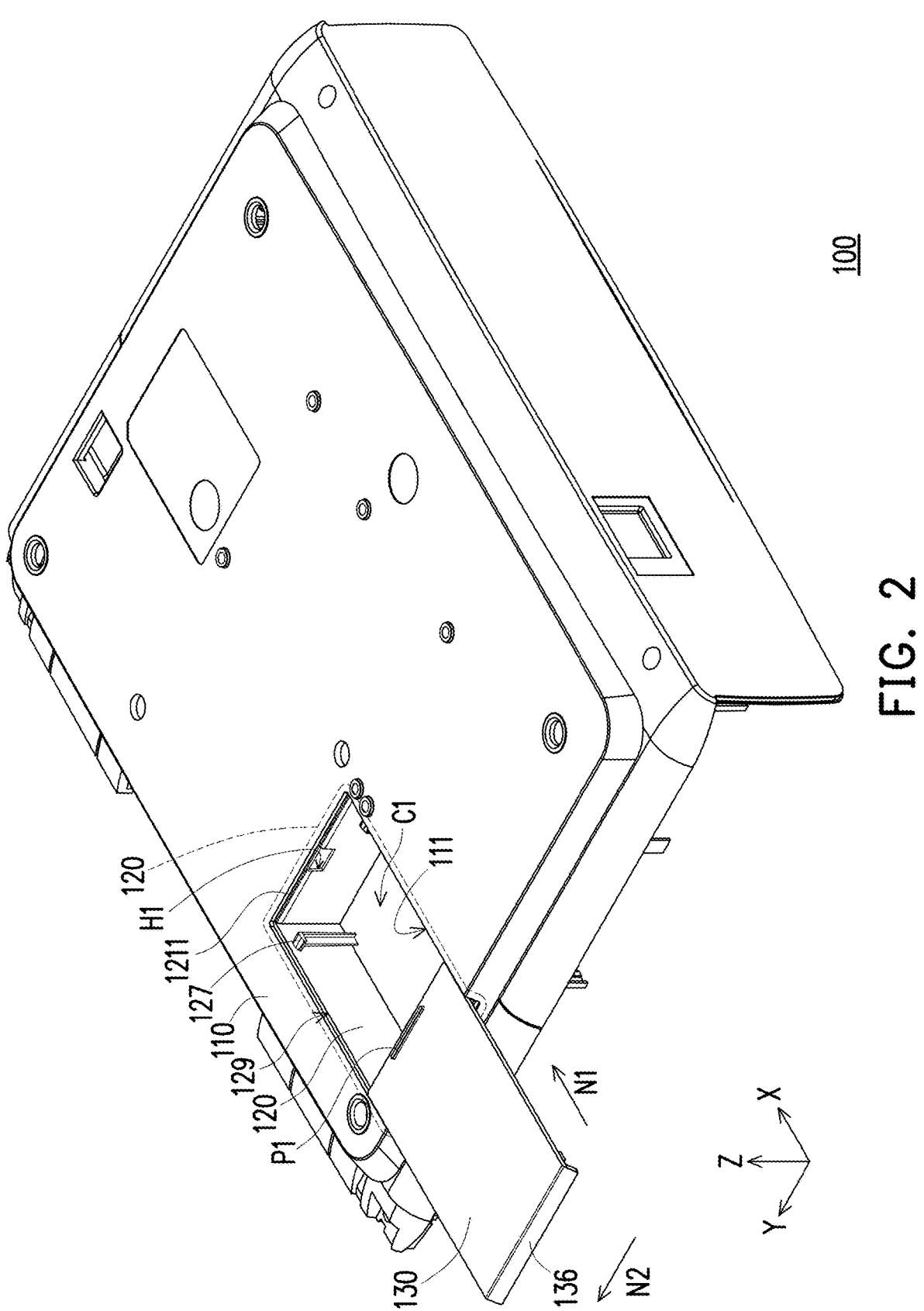
FIG. 2 is a schematic diagram of the cover plate of the case structure in FIG. 1 being opened.
Figure 3:
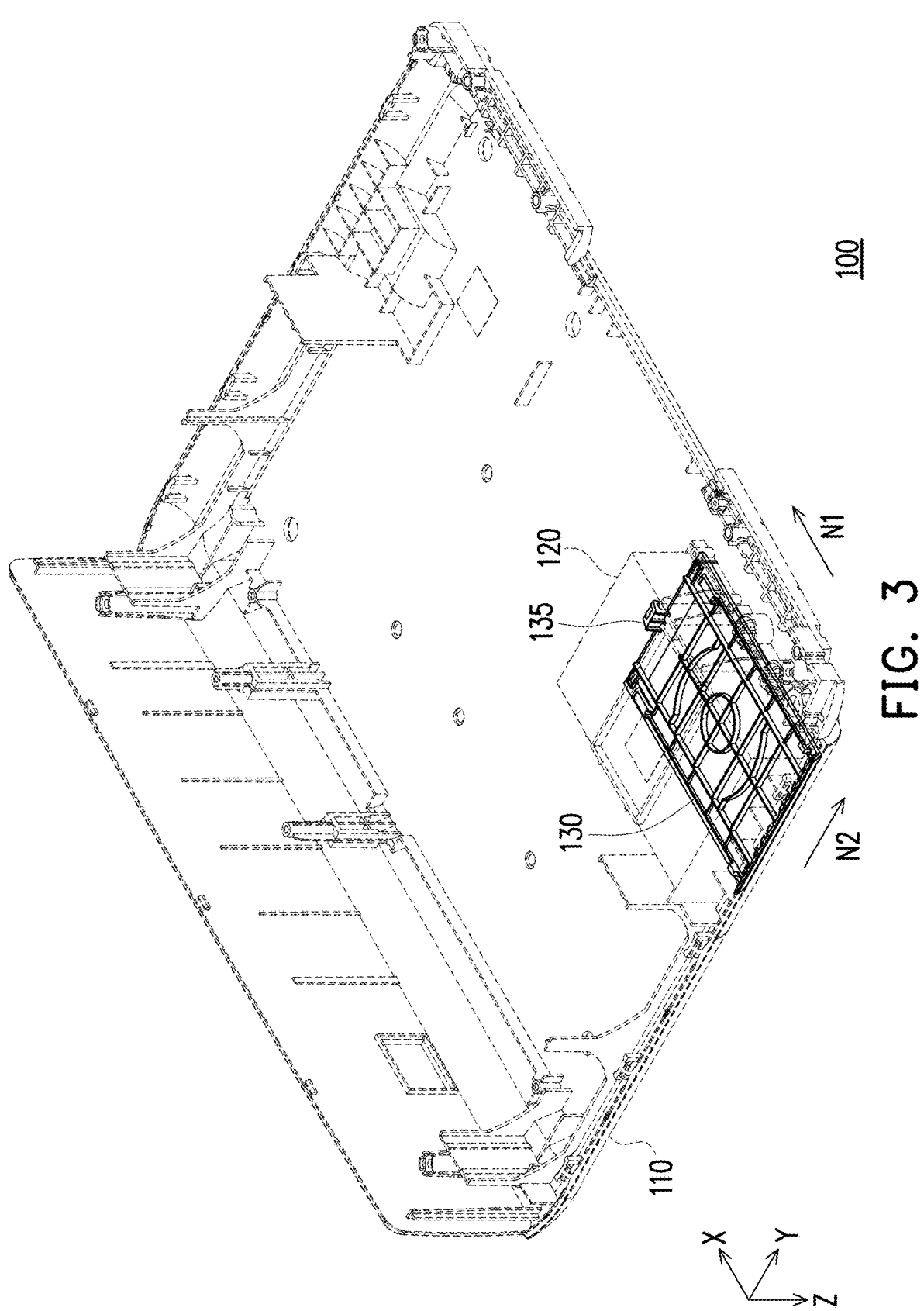
FIG. 3 is a schematic diagram of the case structure in FIG. 1 from another viewing angle.

FIG. 1 is a schematic diagram of a case structure according to an embodiment of the invention. FIG. 2 is a schematic diagram of the cover plate of the case structure in FIG. 1 being opened. FIG. 3 is a schematic diagram of the case structure in FIG. 1 from another viewing angle. It should be noted that the X direction, Y direction, and Z direction are marked in the drawing to present the configuration relationship of each component in the drawing, and the X direction, Y direction, and Z direction intersect with each other, but not limited thereto.

Referring to FIG. 1 to FIG. 3, the case structure 100 of this embodiment includes an enclosure 110, a base 120, and a cover plate 130. The enclosure 110 has an opening 111. The base 120 is located at the opening 111 and has a receiving groove C1. The base 120 is, for example, connected to the enclosure 110 and disposed in the receiving space of the enclosure 110. The receiving groove C1 may be provided with connection ports, adjustment buttons, or other elements. The cover plate 130 is adapted to slide relative to the base 120 along the first direction N1 so that the cover plate 130 moves to the closed position shown in FIG. 1, such that the cover plate 130 may close the receiving groove C1. Here, the first direction N1 is the X direction.

In this embodiment, the case structure 100 is adapted for a projection device, such as a projector. The projection device includes an illumination system, a light valve, and a projection lens. For example, the enclosure 110 is the enclosure of the projection device, and the base 120 and the cover plate 130 are part of the enclosure of the projection device. The illumination system, the light valve, and the projection lens are disposed in the case structure 100. The illumination system includes, for example, a light source, a wavelength conversion element, a light splitting and converging element, and a light homogenizing element, and is configured to provide an illumination beam. The light valve is, for example, a reflective light modulator such as a liquid crystal on silicon panel or a digital micromirror element, etc., or a transmissive light modulator such as an electro-optical modulator, a magneto-optical modulator, or an acousto-optical modulator. The light valve is disposed on the transmission path of the illumination beam, and is configured to convert the illumination beam into an image light beam. The projection lens includes, for example, a combination of one or more optical lenses with diopter, such as various combinations of non-planar lenses such as biconcave lenses, biconvex lenses, meniscus lenses, convex-concave lenses, plano-convex lenses, and plano-concave lenses. The projection lens is disposed on the transmission path of the image light beam, and is configured to project the image beam out of the projection device and transmit it to a projection target, such as a screen or a wall, but not limited thereto.

Figure 4A:
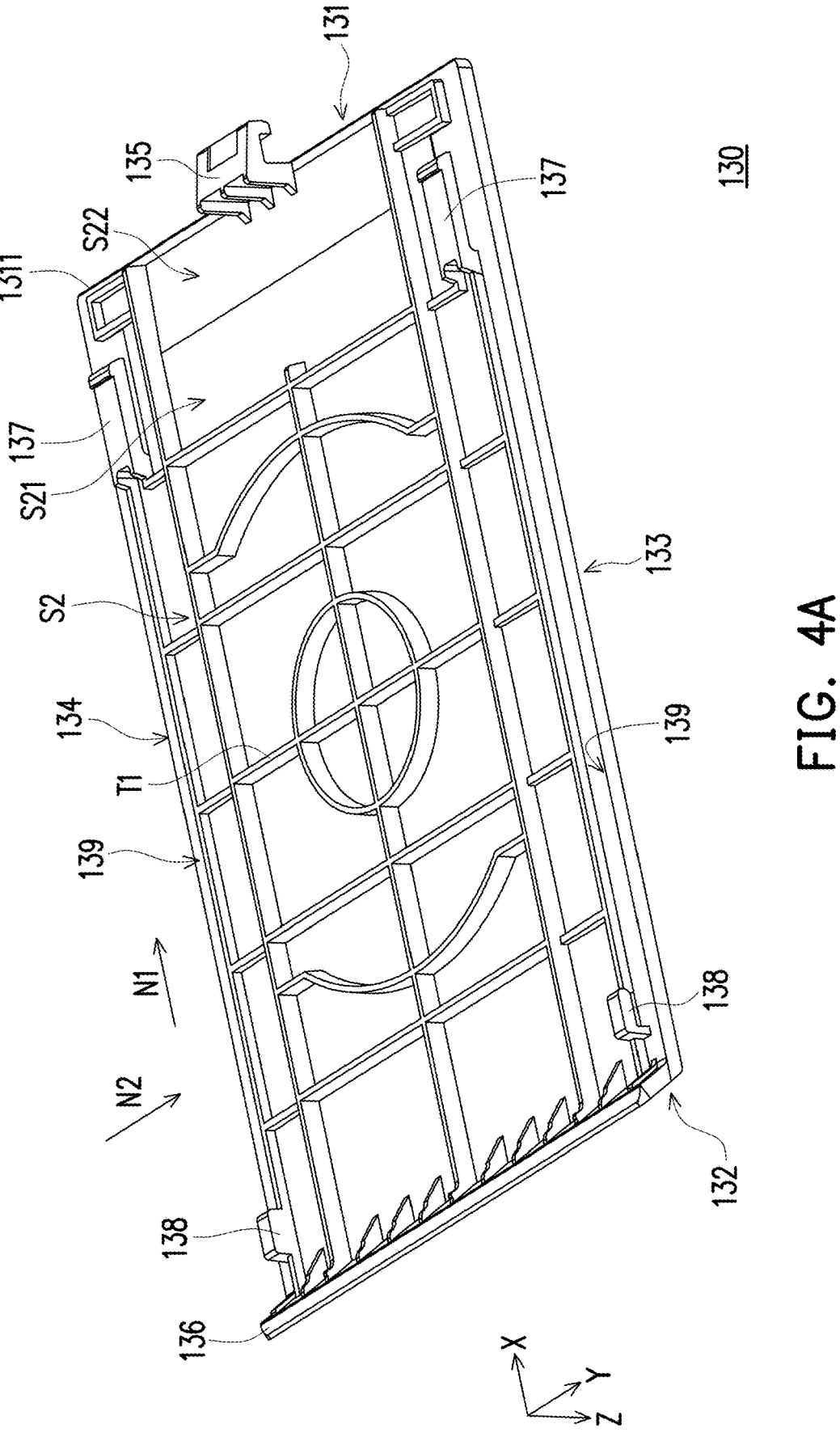
FIG. 4A and FIG. 4B are schematic diagrams of the cover plate of FIG. 1 from different viewing angles.
Figure 4B:
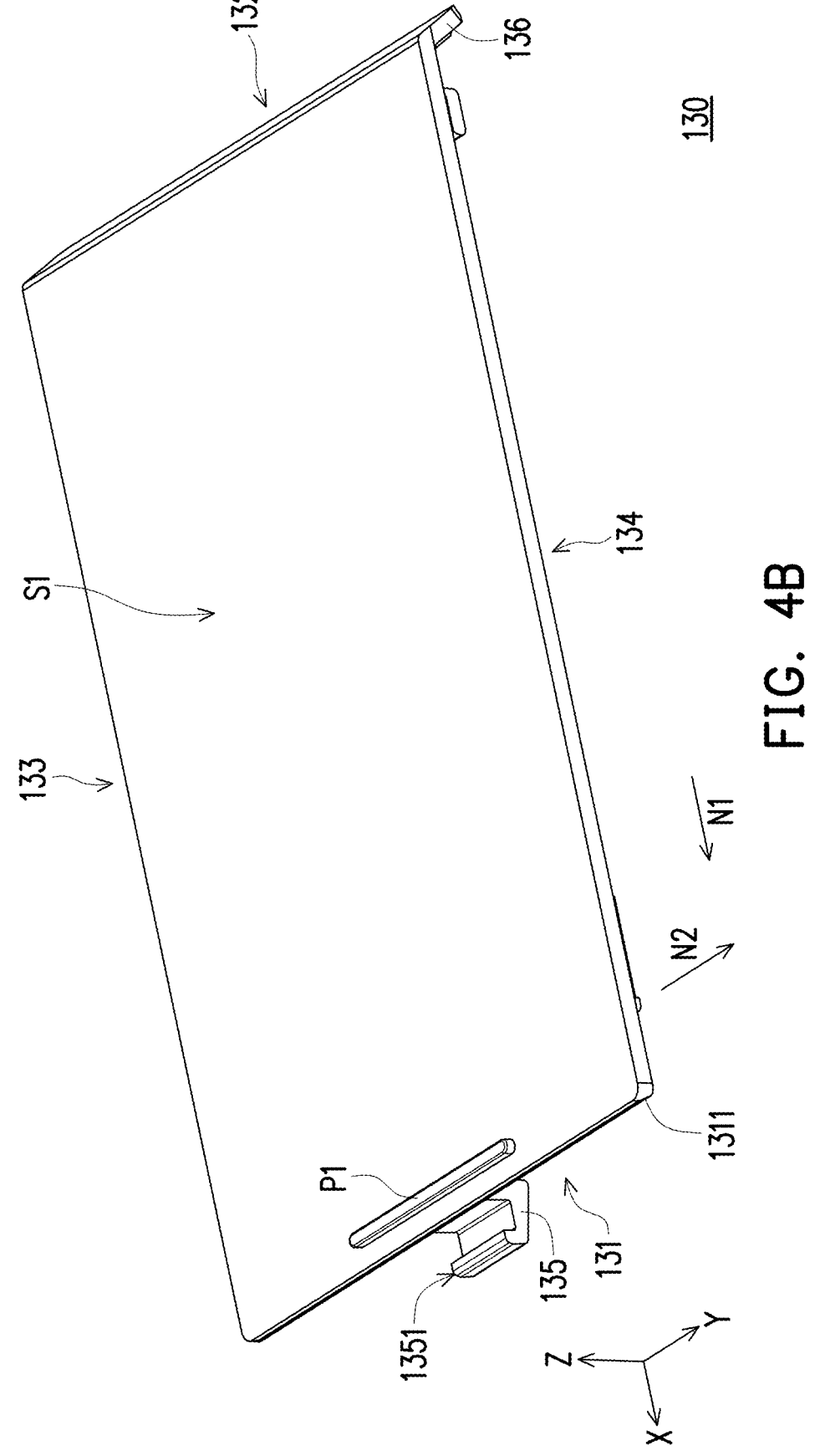

FIG. 4A and FIG. 4B are schematic diagrams of the cover plate of FIG. 1 from different viewing angles. Referring to FIG. 4A and FIG. 4B, in this embodiment, the cover plate 130 has a first cover plate side 131 and a second cover plate side 132 opposite to each other in the first direction N1 and a third cover plate side 133 and a fourth cover plate side 134 opposite to each other in the second direction N2 perpendicular to the first direction N1. Here, the second direction N2 is the Y direction. The first cover plate side 131, the third cover plate side 133, the second cover plate side 132, and the fourth cover plate side 134 are sequentially arranged in a ring shape. In particular, the first cover plate side 131 is, for example, a region range connected to one side of the cover plate 130 and whose width in the first direction N1 is less than or equal to 20% of the width of the cover plate 130 in the first direction N1. The second cover plate side 132, the third cover plate side 133, the fourth cover plate side 134, and the sides mentioned in the invention may be deduced according to the corresponding sides and directions, and are not repeated herein.

In this embodiment, the cover plate 130 has an outer surface S1 and an inner surface S2. The outer surface S1 is, for example, parallel to the first direction N1 and the second direction N2. The cover plate 130 includes a first engaging portion 135 on the first cover plate side 131, a first positioning portion 136 on the second cover plate side 132, and multiple elastic members 137 and multiple slide groove structures 138 on the third cover plate side 133 and the fourth cover plate side 134. In the first direction, the slide groove structures 138 are located between the elastic members 137 and the first positioning portion 136.

Specifically, a quantity of the elastic members 137 is two, in which the elastic members 137 are respectively located near the third cover plate side 133 and the fourth cover plate side 134, and a quantity of the slide groove structures 138 is two, in which the slide groove structures 138 are respectively located on a third cover plate side 133 and a fourth cover plate side 134. In other embodiments, there may be more than two elastic members 137 and slide groove structures 138 on one side, and the invention is not limited thereto.

Figure 5A:
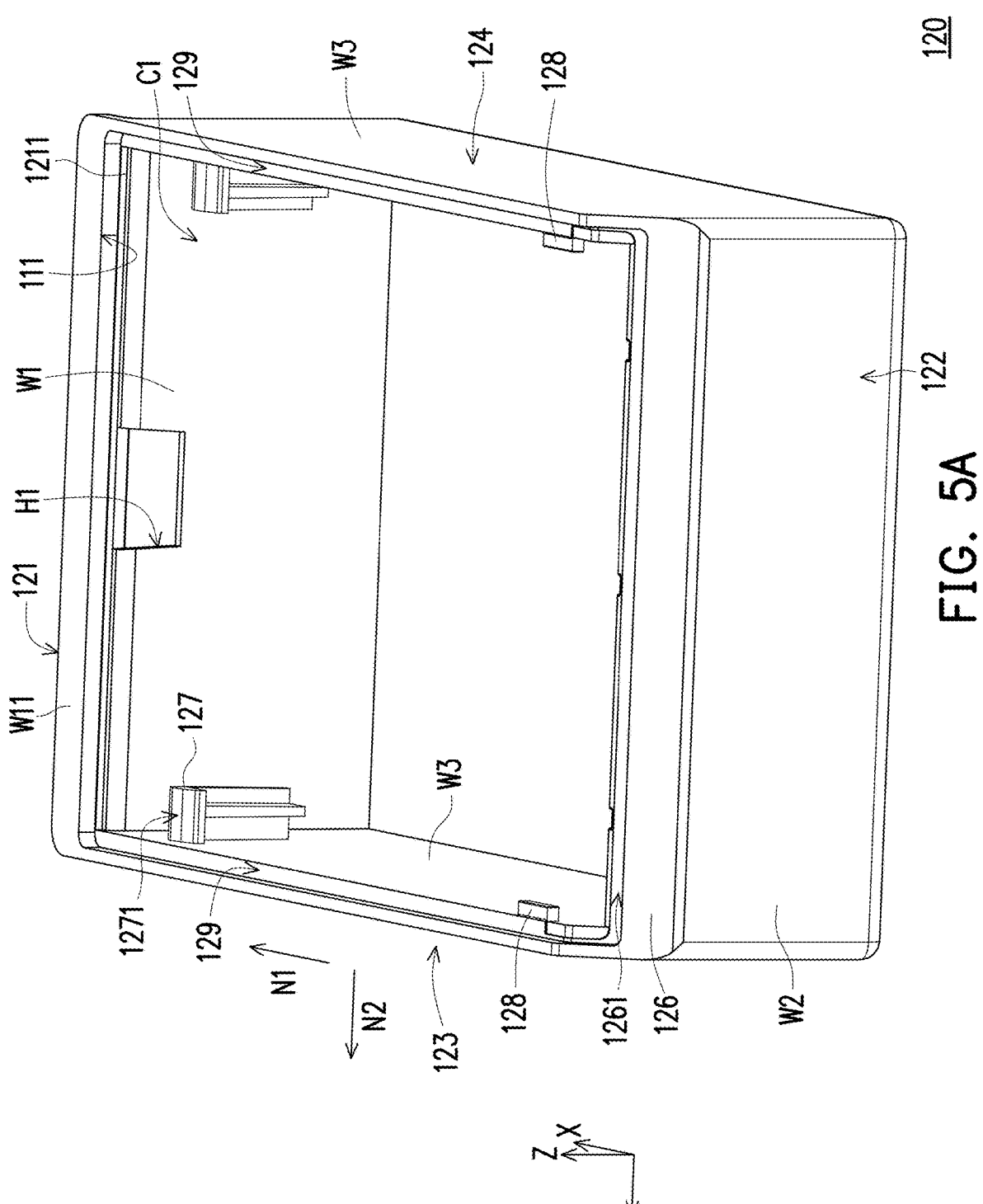
FIG. 5A and FIG. 5B are schematic diagrams of the base of FIG. 1 from different viewing angles.
Figure 5B:
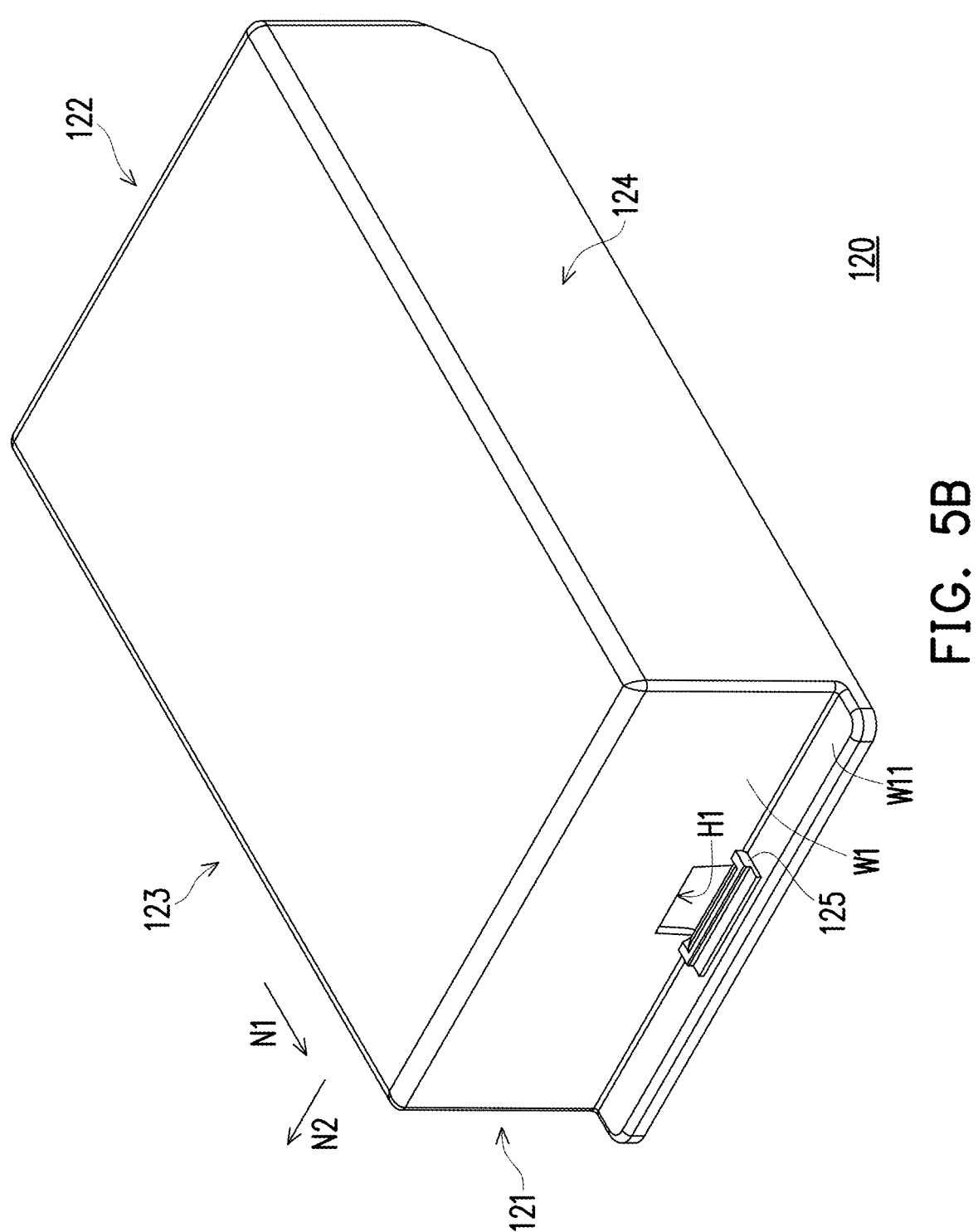

FIG. 5A and FIG. 5B are schematic diagrams of the base of FIG. 1 from different viewing angles. Referring to FIG. 5A and FIG. 5B, in this embodiment, the base 120 has a first base side 121 and a second base side 122 opposite to each other in the first direction N1 and a third base side 123 and a fourth base side 124 opposite to each other in the second direction N2. The first base side 121, the third base side 123, the second base side 122, and the fourth base side 124 are sequentially arranged in a ring shape. As shown in FIG. 1, when the cover plate 130 is moved to the closed position, the first base side 121 and the second base side 122 respectively correspond to the first cover plate side 131 and the second cover plate side 132.

In this embodiment, the base 120 includes a second engaging portion 125 located on the first base side 121, a second positioning portion 126 located on the second base side 122, and multiple pillars 127 and multiple sliders 128 located on the third base side 123 and the fourth base side 124. The sliders 128 are located between the pillars 127 and the second positioning portion 126.

Specifically, a quantity of the pillars 127 is two, in which the elastic members 127 are respectively located on the third base side 123 and the fourth base side 124, and a quantity of the sliders 128 is two, in which the sliders 128 are respectively located on the third base side 123 and the fourth base side 124. In other embodiments, there may be more than two pillars 127 on one side, corresponding to the number of elastic members 137, and the invention is not limited thereto.

Figure 6A:
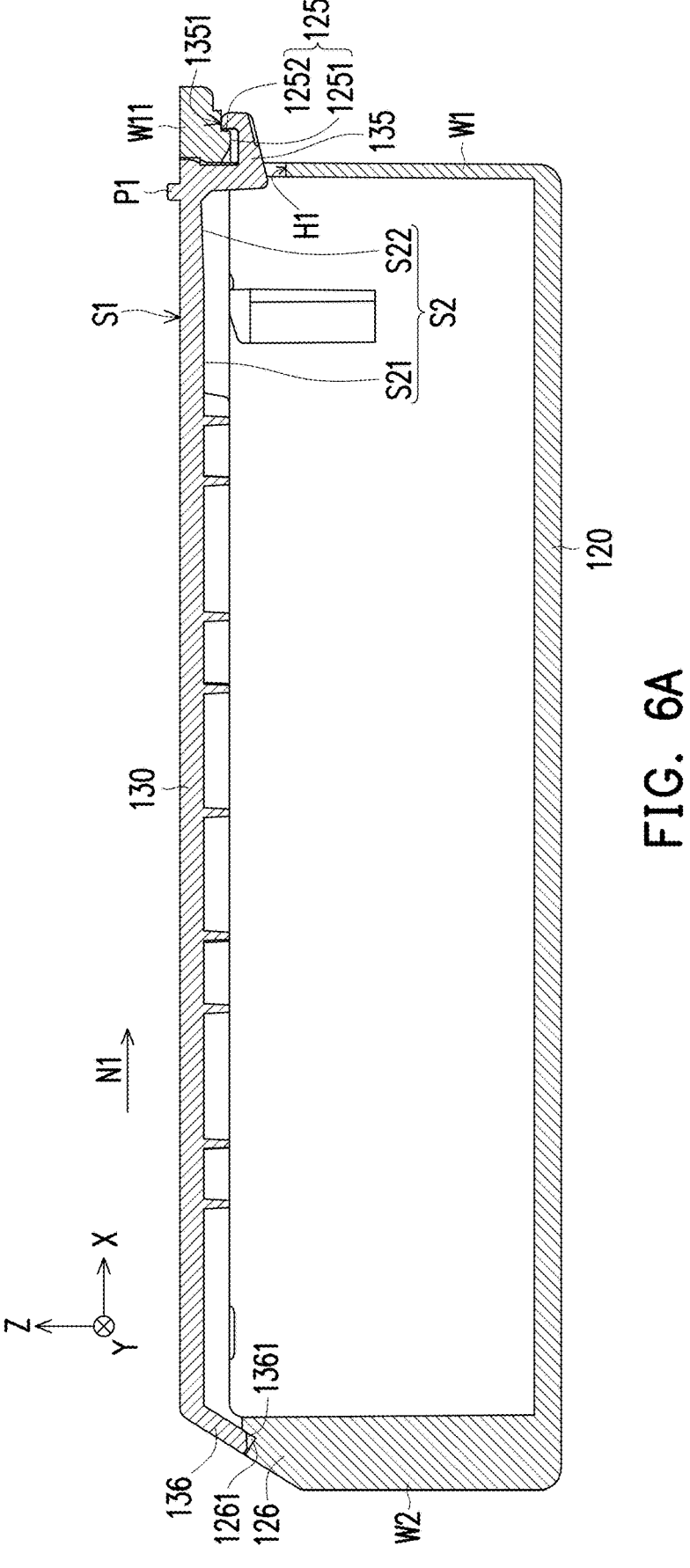
FIG. 6A is a cross-sectional diagram of the case structure in FIG. 1 along the section line A-A'.
Figure 6B:
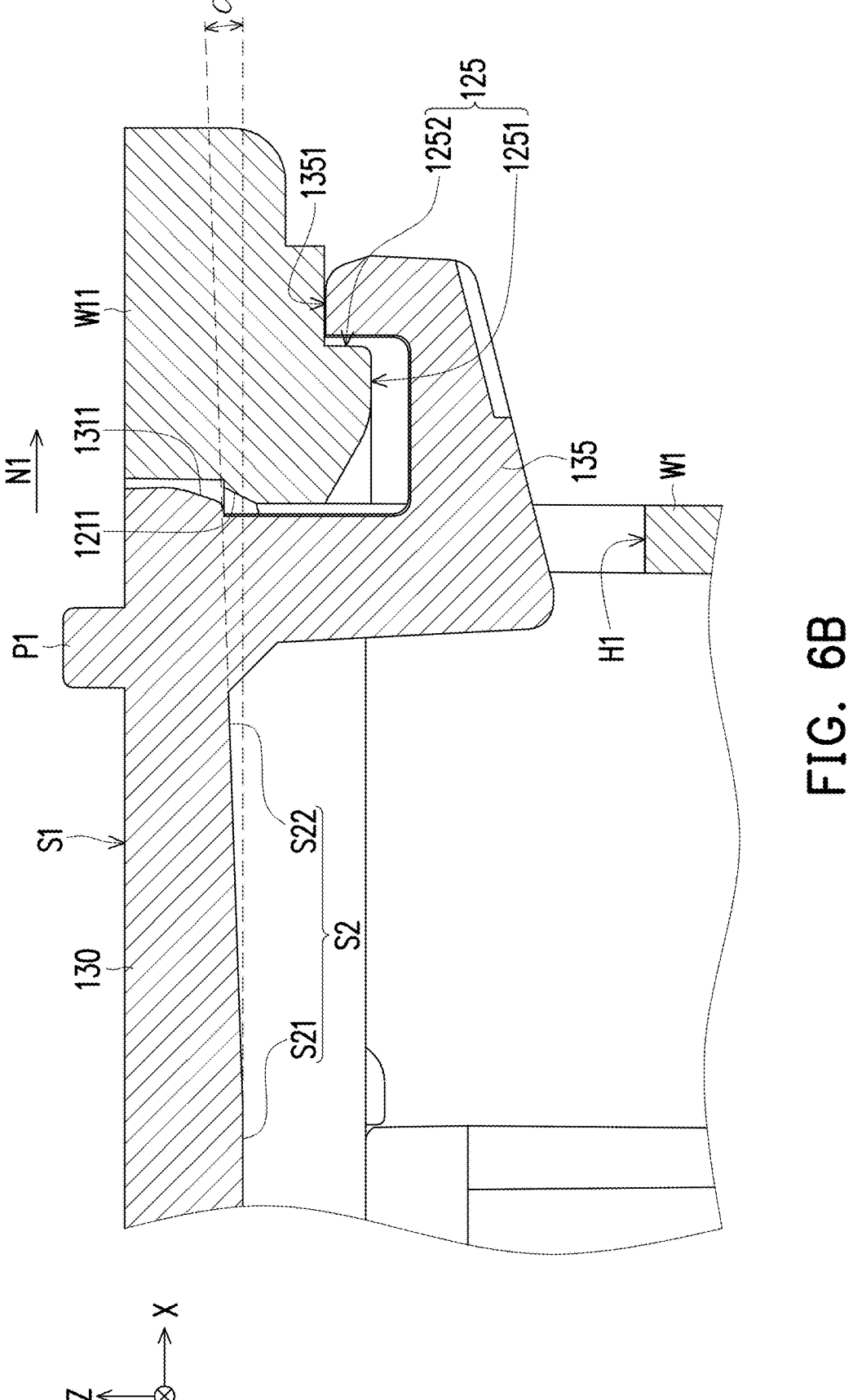
FIG. 6B is a partially enlarged schematic diagram of FIG. 6A.
Figure 7:
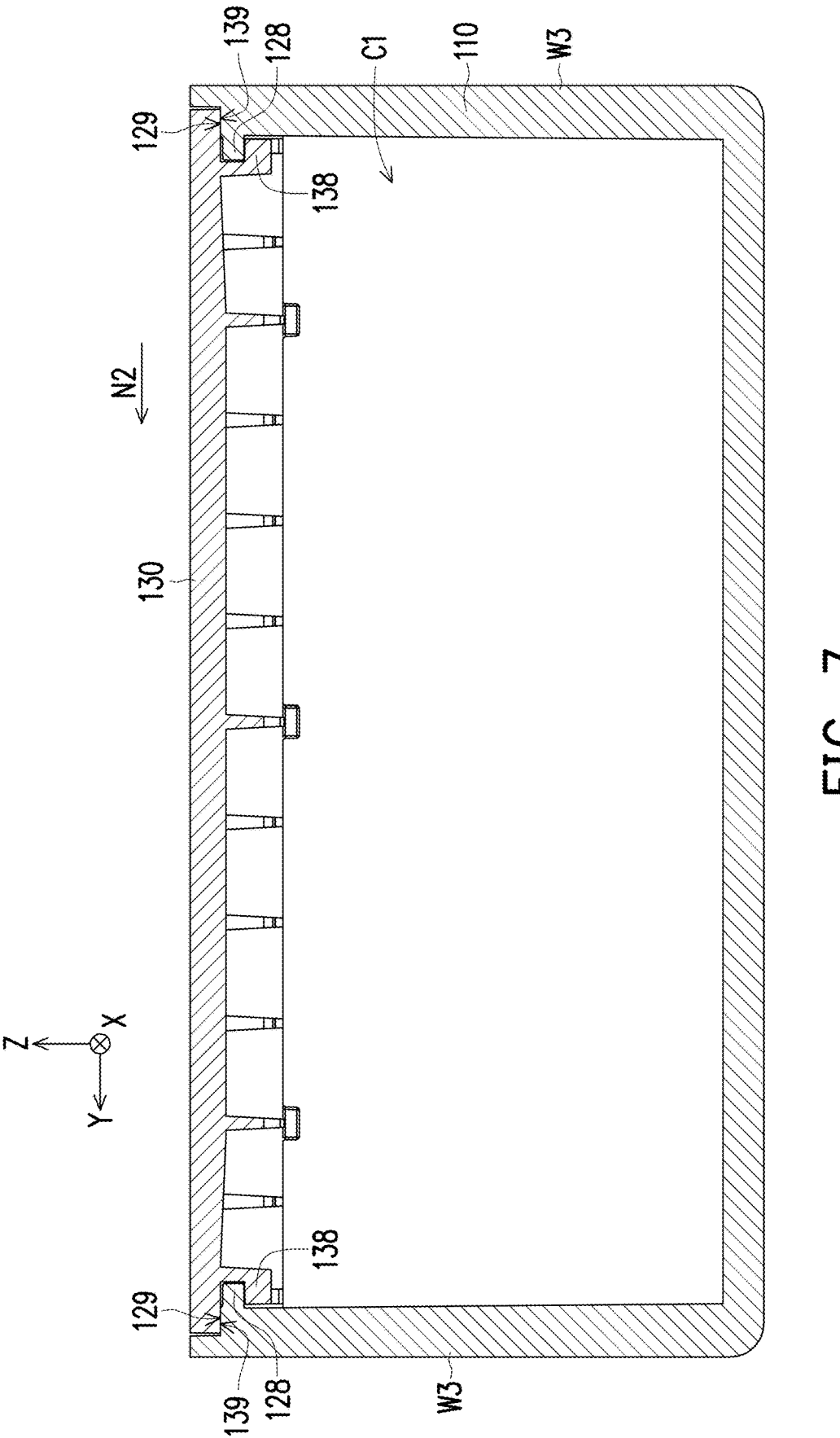
FIG. 7 is a cross-sectional diagram of the case structure in FIG. 1 along the section line B-B'.
Figure 8A:
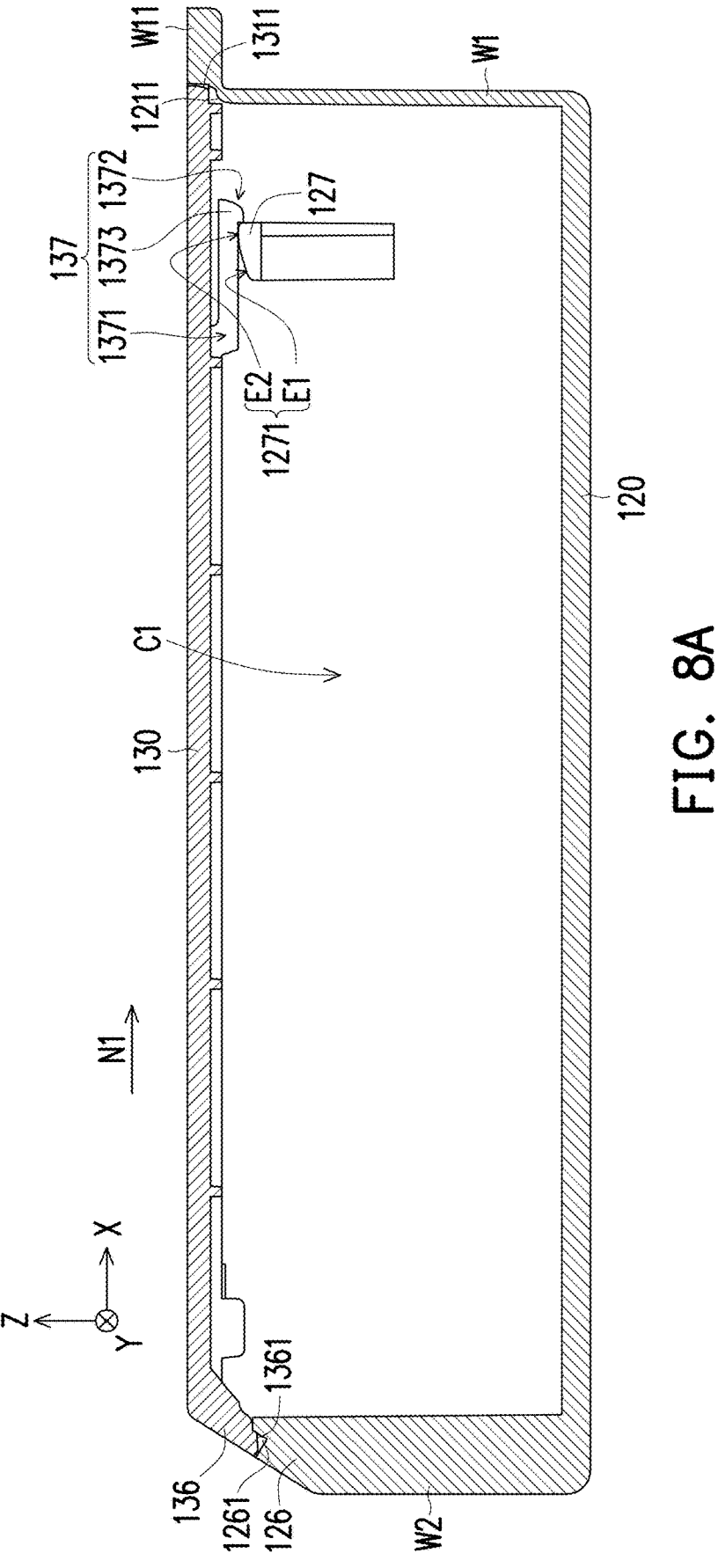
FIG. 8A is a cross-sectional diagram of the case structure in FIG. 1 along the section line C-C'.

FIG. 6A is a cross-sectional diagram of the case structure in FIG. 1 along the section line A-A'. FIG. 6B is a partially enlarged schematic diagram of FIG. 6A. FIG. 7 is a cross-sectional diagram of the case structure in FIG. 1 along the section line B-B'. FIG. 8A is a cross-sectional diagram of the case structure in FIG. 1 along the section line C-C'. Some irrelevant structures in FIG. 6 to FIG. 8A are omitted to facilitate display and identification of components to be explained.

In this embodiment, when the cover plate 130 is in the closed position shown in FIG. 1, the first engaging portion 135 of the cover plate 130 is connected to the second engaging portion 125 of the base 120, and the first positioning portion 136 of the cover plate 130 corresponds to the second positioning portion 126 of the base 120, as shown in FIG. 6A and FIG. 6B. Furthermore, the first engaging portion 135 is, for example, a hook, and has an arc-shaped end portion 1351. The second engaging portion 125 is, for example, a locking block, and has a connected guiding surface 1251 and a stop surface 1252, but the invention is not limited thereto.

On the other hand, in this embodiment, when the cover plate 130 is in the closed position shown in FIG. 1, the slide groove structures 138 are respectively connected to the sliders 128, as shown in FIG. 7.

In this embodiment, when the cover plate 130 is in the closed position shown in FIG. 1, the elastic member 137 is connected to the pillar 127, as shown in FIG. 8A.

In this way, good engaging force may be achieved between the cover plate 130 and the base 120 and the appearance quality requirement of the case structure 100 may be maintained.

In detail, please refer to FIG. 5B, FIG. 6A, and FIG. 6B. In this embodiment, the base 120 includes a first side wall W1 located on the first base side 121 and an extension wall W11 connected to the top of the first side wall W1 (e.g., the side of the first side wall W1 close to the cover plate 130). The second engaging portion 125 is located on a side of the extension wall W11 away from the cover plate 130. The first side wall W1 has a hole H1 close to the second engaging portion 125. When the cover plate 130 is at the closed position, the first engaging portion 135 passes through the hole H1 to be buckled with the second engaging portion 125.

Referring to FIG. 4A, in this embodiment, the inner surface S2 of the cover plate 130 has two first slideways 139 opposite to each other, which are respectively located on the third cover plate side 133 and the fourth cover plate side 134. The elastic members 137 and the slide groove structures 138 are, for example, located between the two first slideways 139. The inner surface S2 has a first inner surface S21 and a second inner surface S22. The first inner surface S21 is located between the elastic members 137, and the second inner surface S22 is located between the first inner surface S21 and the first engaging portion 135. The normal direction of the first inner surface S21 is perpendicular to the first direction N1 and perpendicular to the second direction N2, and the second inner surface S22 is inclined to the first inner surface S21.

Referring to FIG. 5A, the base 120 includes two third side walls W3 respectively located on the third base side 123 and the fourth base side 124, and the base 120 includes two second slideways 129 respectively located on the two third side walls W3. In particular, the enclosure 110 is integrally formed with the base 120, for example, there is no step (i.e., a continuous surface) between the outer surface of the enclosure 110 and a surface (e.g., the top surface of the two third side walls W3 and the extension wall W11) of the base 120.

Under the above configuration, when the cover plate 130 moves to the position shown in FIG. 1, the cover plate 130 advances toward the second engaging portion 125 along the first direction N1 by being supported on the second slideway 129 through the first slide 139, as shown in FIG. 6A and FIG. 7.

Next, the arc-shaped end portion 1351 of the first engaging portion 135 contacts the guiding surface 1251 of the second engaging portion 125, and the first engaging portion 135 is pushed against and deformed. The region of the second inner surface S22 of the cover plate 130 absorbs and separates the deformation stress of the first engaging portion 135 during the aforementioned contact process, causing the region of the cover plate 130 corresponding to the second inner surface S22 to deform and sink (−Z direction), until the arc-shaped end portion 1351 of the first engaging portion 135 moves forward (towards the first direction N1) away from the guiding surface 1251, and thereby the first engaging portion 135 is no longer subjected to pushing resistance.

Since the cover plate 130 continues to move forward along the first direction N1, the region of the cover plate 130 corresponding to the second inner surface S22 returns to its original shape and reaches the stop surface 1252 of the second engaging portion 125, so that the arc-shaped end portion 1351 corresponds to the stop surface 1252, as shown in FIG. 6B. Therefore, the first engaging portion 135 is engaged with the second engaging portion 125, and the cover plate 130 and the base 120 are buckled and fixed.

Referring to FIG. 5A and FIG. 7, in this embodiment, the two sliders 128 of the base 120 are respectively disposed on the two third side walls W3, and the two pillars 127 are respectively disposed on the two third side walls W3.

In this embodiment, when the first engaging portion 135 is engaging with the second engaging portion 125, each of the sliders 128 simultaneously enters into the corresponding groove of the slide groove structure 138 of the cover plate 130 along the first direction N1. Therefore, when the cover plate 130 moves to the closed position shown in FIG. 1, due to the restraint of the slide groove structure 138 on the slider 128, the first positioning part 136 and the second positioning part 126 are able to maintain a certain amount of sliding interference, thus maintaining the smoothness of the step size on the long side and the engaging force. Here, the long side is a side extending along the first direction N1 (X direction).

Referring to FIG. 6A, in this embodiment, the second positioning portion 126 has a groove 1261. When the cover plate 130 is in the closed position shown in FIG. 6A, the end surface 1361 of the first positioning portion 136 is located in the groove 1261. Here, the groove 1261 is, for example, a V-shaped groove, and there is a gap between the end surface 1361 and the groove 1261, but the invention is not limited thereto.

Specifically, the base 120 includes a second side wall W2 located on the second base side 122. The height of the second side wall W2 in the Z direction is, for example, less than the height of the first side wall W1 in the Z direction. The second positioning portion 126 is, for example, a part of the second side wall W2 (e.g., the top of the second side wall W2) and has a chamfer on the outer surface. The groove 1261 of the second positioning portion 126 is located on the top surface of the second side wall W2, and the cross section of the groove 1261 on the X-Z plane is, for example, V-shaped, but the invention is not limited thereto. The first positioning portion 136 is, for example, a side plate. The first positioning portion 136 is inclined to the outer surface S1 of the cover plate 130 and extends toward the base 120 to form a chamfer on the outer surface. The end surface 1361 of the first positioning portion 136 is, for example, the surface of the first positioning portion 136 away from the outer surface S1, but the invention is not limited thereto. Here, the outer surface S1 is, for example, an X-Y plane, and the end surface 1361 is, for example, parallel to the outer surface S1, or the included angle between the end surface 1361 and the outer surface S1 is greater than or equal to 0 degrees and less than or equal to 5 degrees, but the invention is not limited thereto. When the cover plate 130 is in the closed position shown in FIG. 6A, the end surface 1361 of the first positioning portion 136 is located in the groove 1261, that is, in the closed state, the first positioning portion 136 interferes with the second positioning portion 126 in the X direction, so that the cover plate 130 may be prevented from being easily displaced in the −X direction and loosened.

Referring to FIG. 8A, in this embodiment, the elastic member 137 is disposed on the inner surface S2 of the cover plate 130. When the cover plate 130 is in the closed position shown in FIG. 8A, the elastic member 137 connects (abuts) the pillar 127. Specifically, the elastic member 137 has a first end 1371 connected to the inner surface S2 of the cover plate 130 and a second end 1372 extending toward the first cover plate side 131. The elastic member 137 includes a hook 1373 located at the second end 1372, and the hook 1373 is not directly connected to the cover plate 130. Specifically, the elastic member 137 is, for example, a cantilever.

In this embodiment, each of the pillar 127 has an inclined surface 1271. The inclined surface 1271 has a front end E1 and a terminal end E2, and the terminal end E2 is closer to the second engaging portion 125 than the front end E1. The terminal end E2 is higher than the front end E1. That is to say, in the Z direction, the distance between the terminal end E2 and the inner surface S2 of the cover plate 130 is less than the distance between the front end E1 and the inner surface S2 of the cover plate 130.

Figure 8B:
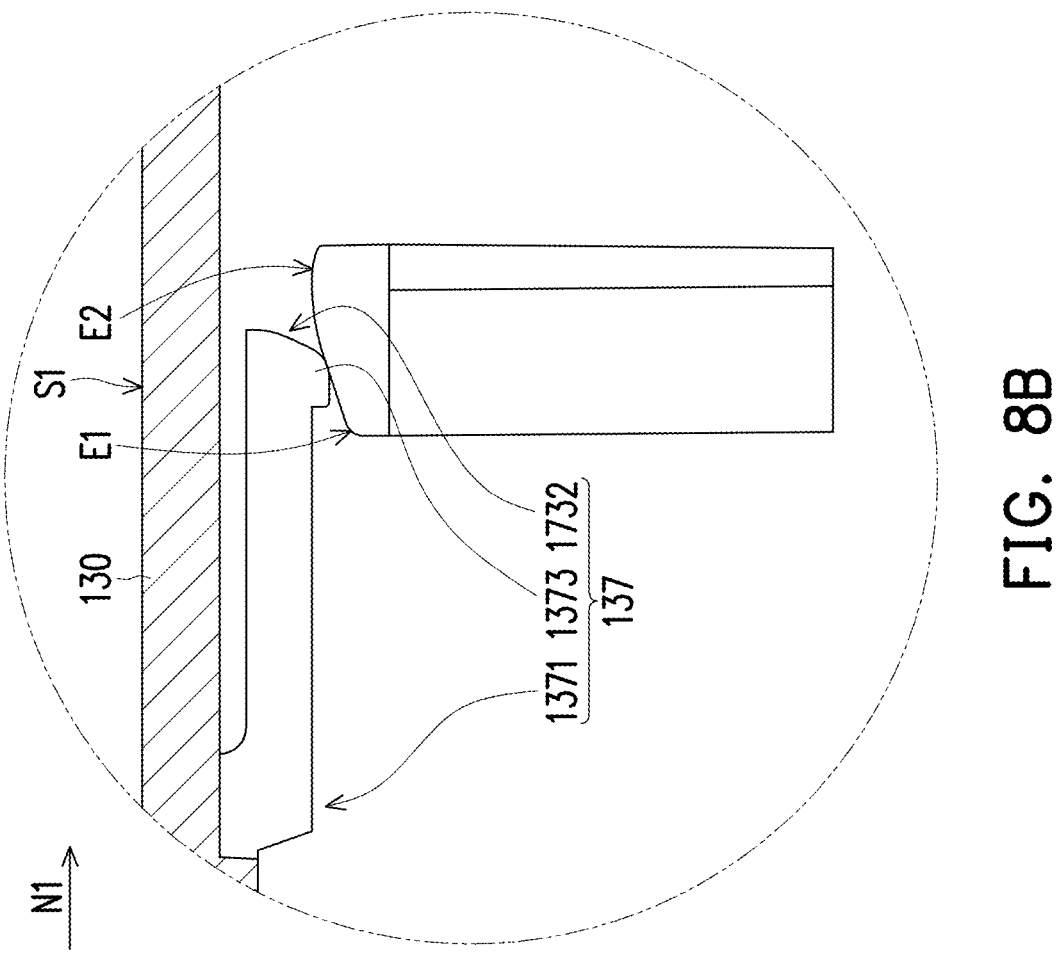
FIG. 8B is a partially enlarged schematic diagram of the elastic member in FIG. 8A before buckling.
Figure 8B:
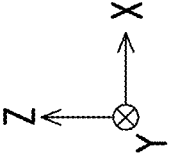

FIG. 8B is a partially enlarged schematic diagram of the elastic member in FIG. 8A before buckling. Referring to FIG. 8A and FIG. 8B, in this embodiment, when the cover plate 130 is moved to the closed position shown in FIG. 1, the hook 1373 slides along the inclined surface 1271 from one side of the pillar 127 to the other side of the pillar 127 and is buckled with the pillar 127.

Furthermore, the elastic member 137 is pushed upward by the inclined surface 1271 of the pillar 127 and gradually deformed until the hook 1373 moves away from the terminal end E2 of the inclined surface 1271 and may be automatically reset by the elastic restoring force of the elastic member 137, so as to be buckled with the pillar 127. When the cover plate 130 is in the closed position, the elastic member 137 is supported by the pillar 127, so that the appearance of the step is smooth and the engaging force is maintained.

On the other hand, please refer to FIG. 4A, FIG. 4B, and FIG. 6A. In this embodiment, the cover plate 130 includes a protruding rib P1 on the outer surface S1. The protruding rib P1 is located on the first cover plate side 131 and corresponds to the first engaging portion 135. The protruding rib P1 corresponds to the second inner surface S22.

In the closed position shown in FIG. 1, if the cover plate 130 is to be pushed, the position of the protruding rib P1 may be pressed down. The cover plate 130 deforms and sinks in the region of the second inner surface S22 until the arc-shaped end portion 1351 of the first engaging portion 135 leaves the stop surface 1252 of the second engaging portion 125 to unlock the first engaging portion 135 and the second engaging portion 125. The cover plate 130 absorbs and diffuses the deformation stress generated by the first engaging portion 135 when it is unbuckled in the region with the second inner surface S22 (diffuses the deformation of the first engaging portion 135 to prevent the first engaging portion 135 from breaking). Here, the pressed position covers the surrounding region of the protruding rib P1, but the invention is not limited thereto.

Referring to FIG. 4A, FIG. 5A and FIG. 6B, the cover plate 130 has a chamfered edge 1311 on the first cover plate side 131, and the base 120 has a chamfered edge 1211 on the first base side 121. When the user presses down on the position of the protruding rib P1, the chamfered edge 1311 of the cover plate 130 and the chamfered edge 1211 of the base 120 are adapted for facing each other. As the cover plate 130 moves toward the second positioning portion 126 along the opposite direction of the first direction N1, the cover plate 130 may be removed.

Referring to FIG. 6A and FIG. 6B, in this embodiment, the average thickness between the first inner surface S21 and the outer surface S1 is greater than the average thickness between the second inner surface S22 and the outer surface S1. The advantage of this design is that the region of the cover plate 130 corresponding to the second inner surface S22 is more likely to be slightly deformed than other regions, so as to achieve the effect of absorbing and diffusing stress.

Specifically, in this embodiment, the second inner surface S22 is inclined to the first inner surface S21, and there is no step between the first inner surface S21 and the second inner surface S22. There is an included angle α between the first inner surface S21 and the second inner surface S22, in which the included angle α is about 2°, but not limited thereto, so that the average thickness between the first inner surface S21 and the outer surface S1 is greater than the average thickness between the second inner surface S22 and the outer surface S1. It should be noted that the design of the included angle α depends on the deformation required. For example, the greater the included angle α, the smaller the average plate thickness corresponding to the second inner surface S22. Therefore, during the unbuckling process, a large amount of deformation may be formed on the second inner surface S22 without applying too much downward pressure on the protruding rib P1.

In this embodiment, with the design of the second inner surface S22 as an inclined surface, the self-deformed portion may be controlled at a position corresponding to the protruding rib P1. Here, the shape of the surface region of the first inner surface S21 and the second inner surface S22 is, for example, a rectangle, but the invention is not limited thereto. As long as the plate thickness corresponding to the periphery of the protruding rib P1 is relatively thin so as to be adapted for absorbing the deformation stress when pressing down, it falls within the scope of protection of the invention.

In addition, referring to FIG. 4A, in this embodiment, the inner surface S2 of the cover plate 130 is provided with multiple reinforcing structures T1, such as ribs, in regions other than the first inner surface S21 and the second inner surface S22, so as to strengthen the structural strength of the cover plate 130. The advantage of such a design is that the self-deformed portion may be more tightly controlled at the position corresponding to the protruding rib P1.

It may be known through experiments that when the cover plate 130 is in the closed position shown in FIG. 1, the step between the surface of the enclosure 110 adjacent to the opening 111 and the outer surface S1 is between 0.06 mm and 0.08 mm, but not limited thereto. A gap between a side of the opening 111 of the enclosure 110 adjacent to the cover plate 130 and a side of the cover plate 130 adjacent to the opening 111 is between 0.14 mm and 0.19 mm, but not limited thereto.

After tests such as a drop test, a vibration test, a mechanical shock test (without packing), etc. are performed, both the cover plate 130 and the base 120 may maintain a good engaging condition.

In this way, the cover plate 130 is only required to be pushed in a single movement direction to complete multi-point engagement, which is simple and labor-saving. The appearance of the step and gap between the cover plate 130 and the base 120 are optimized and controlled. To disassemble the cover plate 130, just press the protruding rib P1 and push it toward the outside of the case structure 100 (−X direction), and the disassembly of the cover plate 130 may be completed. The fixing method of the cover plate 130 and the base 120 may omit auxiliary kits (e.g., screws, springs, washers, elastic pieces, metal hardware, etc.), which is very convenient.

To sum up, in the case structure of the invention, when the cover plate is in the closed position, the first engaging portion is connected to the second engaging portion, the first positioning portion corresponds to the second positioning portion, the elastic members are connected to the pillars, and the slide groove structures are connected to the sliders. In this way, good engaging force may be achieved between the cover plate and the base and the appearance quality requirement of the case structure may be maintained.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A case structure, adapted for a projection device, comprising:

an enclosure, having an opening;

a base, located at the opening and having a receiving groove; and a cover plate, adapted to slide relative to the base along a first direction, so that the cover plate moves to a closed position;

wherein the cover plate has a first cover plate side and a second cover plate side opposite to each other in the first direction and a third cover plate side and a fourth cover plate side opposite to each other in a second direction perpendicular to the first direction, the cover plate comprises a first engaging portion located on the first cover plate side, a first positioning portion located on the second cover plate side, and a plurality of elastic members and a plurality of slide groove structures located on the third cover plate side and the fourth cover plate side, in the first direction, the slide groove structures are located between the elastic members and the first positioning portion, wherein each of the elastic members has a first end connected to an inner surface of the cover plate and a second end extending toward the first cover plate side, and each of the elastic members comprises a hook located at the second end, wherein the base has a first base side and a second base side opposite to each other in the first direction, and a third base side and a fourth base side opposite to each other in the second direction, the base comprises a second engaging portion located on the first base side, a second positioning portion located on the second base side, and a plurality of pillars and a plurality of sliders on the third base side and the fourth base side, each of the pillars has an inclined surface, and the sliders are located between the pillars and the second positioning portion, wherein when the cover plate moves to the closed position, each of the hooks slides from one side of each of the pillars to another side of each of the pillars along each of the inclined surfaces and is buckled with each of the pillars, and when the cover plate is in the closed position, the first engaging portion is connected to the second engaging portion, the first positioning portion corresponds to the second positioning portion, the elastic members are respectively connected to the pillars, and the slide groove structures are respectively connected to the sliders.

2. The case structure according to claim 1, wherein the second positioning portion has a groove, and when the cover plate is in the closed position, an end surface of the first positioning portion is located in the groove.

3. The case structure according to claim 1, wherein the inclined surface has a front end and a terminal end, and the terminal end is higher than the front end and is closer to the second engaging portion than the front end.

4. The case structure according to claim 1, wherein the cover plate has an outer surface and an inner surface, the elastic members are disposed on the inner surface, and the cover plate comprises a protruding rib located on the outer surface, the protruding rib is located on the first cover plate side and corresponds to the first engaging portion.

5. The case structure according to claim 1, wherein the cover plate has a first inner surface and a second inner surface, the first inner surface is located between the elastic members, and the second inner surface is located between the first inner surface and the first engaging portion, wherein a normal direction of the first inner surface is perpendicular to the first direction and perpendicular to the second direction, and the second inner surface is inclined to the first inner surface.

6. The case structure according to claim 5, wherein the cover plate has an outer surface, and an average thickness between the first inner surface and the outer surface is greater than an average thickness between the second inner surface and the outer surface.

7. The case structure according to claim 1, wherein a quantity of the elastic members is two, wherein the elastic members are respectively located near the third cover plate side and the fourth cover plate side, and a quantity of the pillars is two, wherein the pillars are respectively located on the third base side and the fourth base side.

8. The case structure according to claim 1, wherein the base comprises two side walls respectively located at the third base side and the fourth base side, each of the sliders is connected to a corresponding said side wall, and when the cover plate moves to the closed position, each of the sliders enters a corresponding said slide groove structure along the first direction.

9. The case structure according to claim 1, wherein the base comprises a side wall located at the first base side and an extension wall connected to the top of the side wall, the second engaging portion is located on a side of the extension wall away from the cover plate, the side wall has a hole close to the second engaging portion, and when the cover plate is in the closed position, the first engaging portion passes through the hole to be buckled with the second engaging portion.

10. A case structure, adapted for a projection device, comprising:

an enclosure, having an opening;

a base, located at the opening and having a receiving groove; and a cover plate, adapted to slide relative to the base along a first direction, so that the cover plate moves to a closed position;

wherein the cover plate has a first cover plate side and a second cover plate side opposite to each other in the first direction and a third cover plate side and a fourth cover plate side opposite to each other in a second direction perpendicular to the first direction, the cover plate comprises a first engaging portion located on the first cover plate side, a first positioning portion located on the second cover plate side, and a plurality of elastic members and a plurality of slide groove structures located on the third cover plate side and the fourth cover plate side, in the first direction, the slide groove structures are located between the elastic members and the first positioning portion, wherein the base has a first base side and a second base side opposite to each other in the first direction, and a third base side and a fourth base side opposite to each other in the second direction, the base comprises a second engaging portion located on the first base side, a second positioning portion located on the second base side, and a plurality of pillars and a plurality of sliders on the third base side and the fourth base side, the sliders are located between the pillars and the second positioning portion, wherein when the cover plate is in the closed position, the first engaging portion is connected to the second engaging portion, the first positioning portion corresponds to the second positioning portion, the elastic members are respectively connected to the pillars, and the slide groove structures are respectively connected to the sliders, wherein the cover plate has a first inner surface and a second inner surface, the first inner surface is located between the elastic members, and the second inner surface is located between the first inner surface and the first engaging portion, wherein a normal direction of the first inner surface is perpendicular to the first direction and perpendicular to the second direction, and the second inner surface is inclined to the first inner surface.

11. The case structure according to claim 10, wherein the cover plate has an outer surface, and an average thickness between the first inner surface and the outer surface is greater than an average thickness between the second inner surface and the outer surface.

* * * * *